Sept. 27, 1932.  O. KREMMLING  1,879,328
APPARATUS FOR MANUFACTURING PASTRIES AND CONFECTIONERY
Filed May 4, 1931   2 Sheets-Sheet 1
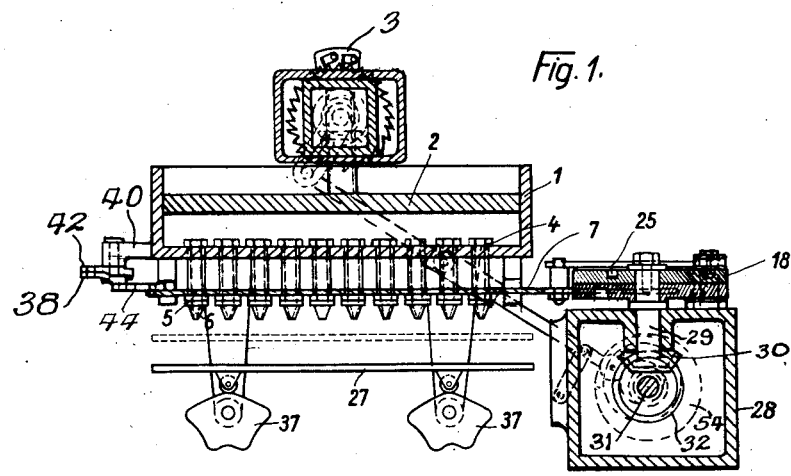
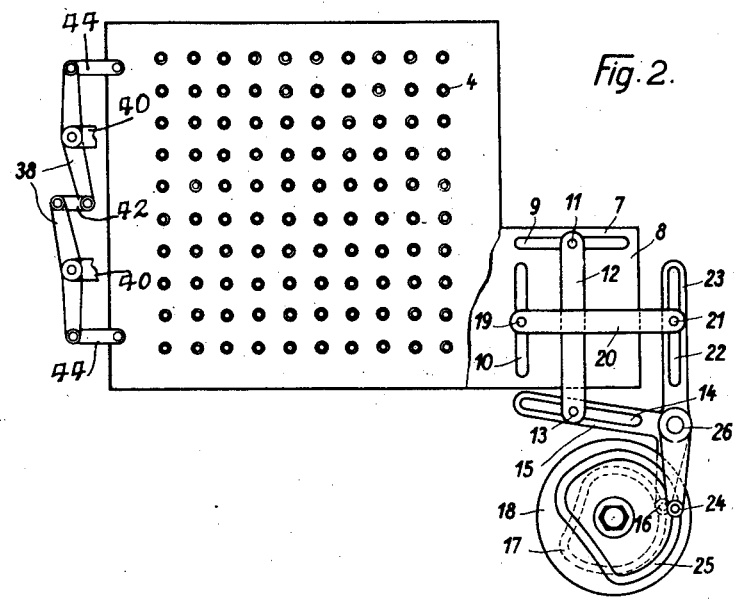
Inventor:
Otto Kremmling
By
Attorney Sept. 27, 1932.  O. KREMMLING  1,879,328
APPARATUS FOR MANUFACTURING PASTRIES AND CONFECTIONERY
Filed May 4, 1931  2 Sheets-Sheet 2
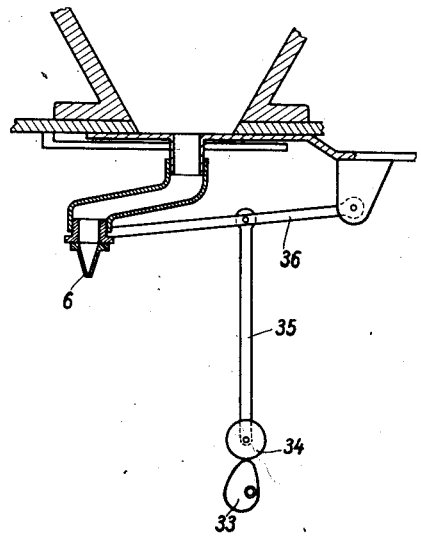
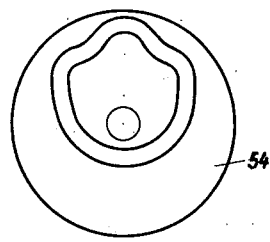
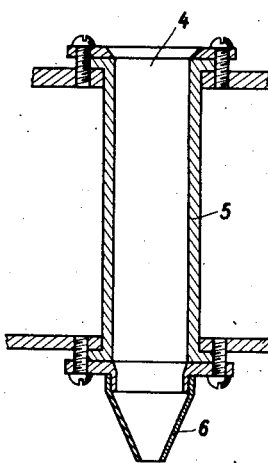
Inventor:
Otto Kremmling
By
Attorney Patented Sept. 27, 1932

1,879,328

UNITED STATES PATENT OFFICE

OTTO KREMMLING, OF HAMERSLEBEN, GERMANY, ASSIGNOR TO ARIBERT KREMM-LING, OF HAMERSLEBEN, NEAR OSCHERSLEBEN, GERMANY

APPARATUS FOR MANUFACTURING PASTRIES AND CONFECTIONERY

Application filed May 4, 1931, Serial No. 535,014, and in Germany July 19, 1930.

The invention relates to an apparatus for manufacturing pieces of pastry and confectionery on expressing machines, wherein the mass is expressed and deposited linearly.

The main feature of the invention consists of open nozzles connected to the expressing chamber by intermediate members, which permit of any desired movement of the nozzles relatively to the outlet openings in the expressing chamber and relatively to the support situated below the nozzles. The construction may be such that the dressing nozzles execute one part of the horizontal and vertical movement, while the support executes the other part of the movement. For example, the dressing nozzles may be moved in a horizontal direction, while the support is moved in a substantially vertical direction, or vice versa. The dressing nozzles may execute, however, both parts of the movement, that is to say, they may be moved in the horizontal and vertical direction, and likewise the support may also execute both parts of the movement.

Thereby, the mechanical manufacture of pieces of pastry of any desired shape is rendered possible by simple means, wherein the movements take place as if by hand of the nozzles or of the support or of both.

Several constructional examples of the apparatus are shown in the accompanying drawings, wherein:

Figure 1 shows an ordinary box press with dressing nozzles.

Figure 2 is a view of the bottom plate carrying the expressing openings and having means for controlling the dressing nozzles.

Figure 3 shows tubes of another kind with nozzles and connected to openings in the bottom plate, and the device for raising and lowering the dressing nozzles.

Figure 4 is a section on an enlarged scale through a dressing tube.

Figure 5 shows a special construction of a cam disc.

Figure 1 shows an ordinary box press 1 with an expressing plunger 2, which is adapted to be actuated by a ratchet gear 3. In the bottom of the box press there are provided openings 4 to which are connected the movable intermediate members 5, for example, tubes which open into dressing nozzles 6. It is essential for the invention that the dressing nozzles remain continuously open.

The nozzles 6 in the example shown are mounted with their lower ends in a plate 7, the sides of which are provided with projections 8 wherein are machined slots 9 and 10.

A connecting rod 12 engages in the slot 9 by means of a pin 11, the other end of which connecting rod engages by means of a pin 13 the slot 14 of one arm of a bell crank 15. The bell crank 15 carries on its shorter arm a roller 16 engaging the lower cam track constructed in the form of a groove 17 in a cam disc 18.

One end of a connecting rod 20 is slidable by means of a pin 19 in the slot 10 of the projection 8, the other end of which rod is connected by means of a pin 21 to the slot 22 of a double armed lever 23. On its shorter end, the lever 23 carries a roller 24, which engages the upper groove 25 of the cam disc 18.

Both levers, namely the bell crank 15 and the double armed lever 23 are rotatable on a pin 26, which is secured at its lower end to a casing 28. In the casing is mounted a vertical driving shaft 29, carrying at its lower end a bevel wheel 30 which meshes with a bevel wheel 32 fast on the shaft 31. The shaft 31 is driven by a chain and sprocket gear or in any other convenient way.

The shaft 29 on its upper end carries an exchangeable cam disc 18 which, as previously mentioned, actuates by means of its grooves 17 and 25 the rollers 16 and 24 as well as the bell crank lever 15 and the double armed lever 23. The levers 15 and 23 will now execute special movements according to the shape of the grooves in the cam disc 18. The lever 23, by means of the connecting rod 20, moves the plate 7 in the longitudinal direction of the machine, while the bell crank 15 by means of the connecting rod 12, moves the plate 7 at right angles to the longitudinal direction of the machine. Both movements combined produce, each revolution of the cam, the desired shape of the piece of pastry or other material to be manufactured.

By adjusting the connecting rod 20 in the slots 22 and 10, the amplitude of longitudinal movement of the plate 7 may be adjusted to any desired amount. By shifting the connecting rod 12 in the slots 9 and 14, the amplitude of the transverse movement of the plate is likewise adjustable as desired. Hence, it is possible to regulate the movements of the plate 7 in any way whatsoever. For example, the transverse movement may be adjusted to be small, while the longitudinal movement is adjusted to be large. Conversely, however, the transverse movement may also be made large and the longitudinal movement small. Also both movements may be made small or large and likewise also all intermediate values may be adjusted.

The cam tracks, which serve to control the movement, instead of being on one single cam disc 18, as in the example chosen, may also be provided each on one of a plurality of cam discs. Preferably, the cam discs carrying the cam tracks are exchangeable to permit pieces of material of different shapes to be manufactured in rapid succession.

In order to permit regulation of the size of the pieces of material produced, the members controlling the driving device are adjustable. This may be accomplished in the example shown by shifting the rods 12, 20 in the slot guides 9, 10, 14 and 22.

In order to impart extra thickness to the front or rear end of the material extruded, the cam disc 18 is preferably turned forwardly or backwardly on the driving shaft 18, thus altering the expressing times in relation to the dressing times. If, however, the cam tracks 17, 25 are rotated relatively to one another, a fundamental alteration is effected in the shape of the pieces of extruded material. Thus, it is possible to alter the shapes and contours of the work-pieces as desired.

In order to detach the dressing nozzles 6 from the dressed pieces of material at the end of the dressing operation, the machine is so designed that the dressing nozzles and the support (baking sheet, conveyor belt or the like) are able to execute a relative movement in a substantially vertical direction, which preferably takes place more or less abruptly. This may be attained by means of a cam gear which raises or lowers either the dressing nozzles or the whole of the upper portion or also, however, the support. In the example illustrated in Figure 3 there is shown such a means of control which raises the dressing nozzles themselves. In this example, the tubes are so constructed that they may be given any movement in the vertical direction. It is thus possible, according to the design of the cam tracks, to execute dressing movements in a vertical direction and to detach the nozzles from the work-pieces at the end of the dressing movements.

The device comprises a cam disc 33, on which is guided a roller 34 mounted on the lower end of a rod 35. The upper end of the rod 35 engages a lever 36 which is pivoted at one end while its other end moves the dressing nozzle 6.

Figure 1 shows a cam gear which raises and lowers the support 27. For the sake of simplicity, only the cams 37 are shown, the other parts of this device having been omitted. A similar construction may also be employed for raising and lowering the upper portions. In the constructional example shown in Figure 1, the cams 37 are so designed as to cause dressing nozzles and support to approach one another or move away from one another in a substantially vertical direction and in a pre-determined sequence also during the dressing movement, whereby thickened portions or upwardly directed corrugations are produced on the dressed pieces of material themselves.

As regards the action of the apparatus, it is immaterial whether the dressing nozzles 6 execute the one part and the support 27 executes the other part of the vertical and horizontal movements or whether the dressing nozzles or the support (baking sheet, conveyor belt or the like) execute alone both parts of the movements. If a conveyor belt is used as a support, either the entire conveyor belt or merely that portion of the conveyor belt which is situated below the dressing nozzles, may be moved up and down in order to dress the pieces of material and detach them from the nozzles.

In order that all the dressing parts of a plate shall execute the same movement, a parallel guide is provided. This parallel guide is comprised of a pair of double armed levers 38 which are pivotally mounted on support arms 40 secured to the expressing chamber 1. The double armed levers 38 are linked together by the link 42. The outer ends of the levers 38 are connected to the nozzle plate by means of links 44. Instead of these means, however, other known means may be provided for the same purpose.

In order to prevent swelling of the mass after the dressing process, a double ratchet and pawl gear with a suitable operating means may be provided for pressing the plunger 2, which gear, after each expressing stroke, moves the pressing plunger upwardly (i. e. back) again. By means of this device, a vacuum is produced which prevents the mass from dropping out afterwards.

Figure 4 shows an intermediate member 5 on an enlarged scale. The intermediate members 5 (in the example tubes) are attached in the openings 4 in the bottom plate and terminate downwardly in mouthpieces fixed to the plate 7. The nozzles 6 are then screwed for ready interchangeability to the said mouthpieces.

Figure 5 shows a particular design of the cam disc 54 for driving the ratchet gear 3 in Figure 1. Due to the design of the cam disc, the expressing of the material does not take place in one continuous operation but intermittently, thus producing streaks of extruded material of straight or curved form and of varying thickness.

The apparatus according to the invention is not restricted to the constructional examples. For example, the dressing movement in the horizontal plane may be composed of two resultant movements in such a way for example that the dressing nozzles move only transversely of the machine, the support executing the movement in the longitudinal direction of the machine that is required for the shape, or vice versa. Moreover, any expressing or dressing machine other than that shown in the constructional examples may be used for expressing the material.

What I claim is:—

1. In a dough machine, an expressing chamber, a plurality of nozzles disposed beneath said expressing chamber and connected thereto by flexible tubes, a nozzle plate having openings therein for said tubes and mounted for horizontal movement for guiding said nozzles, one corner of said nozzle plate having two longitudinal slots therein at right angles to each other, each of said slots being parallel to an edge of said nozzle plate, a rotating disc provided with guide grooves, a pair of pivotally mounted double-armed levers, one of said levers forming substantially a right angle and the other forming substantially a straight angle, one arm of each of said levers being engaged in one of said guide grooves, the other arm of each lever having longitudinal slots therein, and a pair of links, one end of each being adjustably secured in one of the slots in the lever arms and the other end of each being adjustably secured in one of the slots in the nozzle plate.

2. In a dough machine, an expressing chamber, a plurality of nozzles disposed beneath said expressing chamber and connected thereto by flexible tubes, a nozzle plate having openings therein for said tubes and mounted for horizontal movement for guiding said nozzles, one corner of said nozzle plate having two longitudinal slots therein at right angles to each other, each of said slots being parallel to an edge of said nozzle plate, a rotating disc provided with guide grooves, a pair of pivotally mounted double-armed levers, one of said levers forming substantially a right angle and the other forming substantially a straight angle, one arm of each of said levers being engaged in one of said guide grooves, the other arm of each lever having longitudinal slots therein, and a pair of links, one end of each being adjustably secured in one of the slots in the lever arms and the other end of each being adjustably secured in one of the slots in the nozzle plate, and means for equally distributing the force transmitted to said nozzle plate comprising a pair of pivot supports extending from one side of the expressing chamber, and a pair of linked double armed levers pivotally mounted on said pivot supports and linked to said nozzle plate.

In testimony whereof I affix my signature.

OTTO KREMMLING.